US008610766B2

(12) United States Patent
Ding et al.

(10) Patent No.: US 8,610,766 B2
(45) Date of Patent: Dec. 17, 2013

(54) ACTIVITY DETERMINATION AS FUNCTION OF TRANSACTION LOG

(75) Inventors: Lei Ding, Hawthorne, NY (US); Quanfu Fan, Hawthorne, NY (US); Arun Hampapur, Hawthorne, NY (US); Sharathchandra U. Pankanti, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 12/890,007

(22) Filed: Sep. 24, 2010

(65) Prior Publication Data

US 2012/0075450 A1     Mar. 29, 2012

(51) Int. Cl.
*G06K 9/00* (2006.01)
*H04N 7/18* (2006.01)

(52) U.S. Cl.
USPC .............................. 348/77; 348/150

(58) Field of Classification Search
USPC .......................................... 348/77
See application file for complete search history.

(56) References Cited

U.S. PATENT DOCUMENTS

| 6,236,736 | B1 | 5/2001 | Crabtree et al. |
| 2006/0104479 | A1 | 5/2006 | Bonch-Osmolovskiy |
| 2006/0243798 | A1 | 11/2006 | Kundu et al. |
| 2007/0058040 | A1* | 3/2007 | Zhang et al. ................ 348/150 |
| 2008/0018738 | A1 | 1/2008 | Lipton et al. |
| 2008/0218591 | A1 | 9/2008 | Heier et al. |
| 2008/0303902 | A1 | 12/2008 | Romer et al. |
| 2009/0026269 | A1 | 1/2009 | Connell, II et al. |
| 2009/0236419 | A1 | 9/2009 | Connell, II et al. |
| 2010/0030685 | A1 | 2/2010 | Bobbitt et al. |

FOREIGN PATENT DOCUMENTS

WO     2008008505 A2     1/2008

OTHER PUBLICATIONS

International Search Report, International application No. PCT/EP2011/065308, dated Oct. 26, 2011.
Fan, Quanfu et al, "Recognition of Repetitive Sequential Human Activity", Computer Vision and Pattern Recognition, 2009, CVPR 2009, IEEE Conference, Piscataway, NJ, USA, Jun. 20, 2009, pp. 943-950.
Kyoko Sudo et al, "Estimating Anomality of the video sequences for surveillance using 1-class SVM", IEICE Transactions on Information and Systems, vol. 91, No. 7, 7 Jul. 7, 2008, pp. 1929-1936.

(Continued)

*Primary Examiner* — Sath V Perungavoor
*Assistant Examiner* — Howard D Brown, Jr.
(74) *Attorney, Agent, or Firm* — Patrick J. Daugherty; Driggs, Hogg, Daugherty & Del Zoppo Co., LPA

(57) ABSTRACT

Human behavior alerts are determined from a video stream through application of video analytics that parse a video stream into a plurality of segments, wherein each of the segments are either temporally related to at least one of a plurality of temporally distinct transactions in an event data log; or they are each associated with a pseudo transaction marker if not temporally related to at least one of the temporally distinct transactions and an image analysis indicates a temporal correlation with at least one of the distinct transactions is expected. Visual image features are extracted from the segments and one-SVM classification is performed on the extracted features to categorize segments into inliers or outliers relative to a threshold boundary. Event of concern alerts are issued with respect to the inlier segments associated with the associated pseudo transaction marker.

12 Claims, 5 Drawing Sheets

(56) References Cited

OTHER PUBLICATIONS

Lei Ding et al, "Graph Based Event Detection from Realistic Videos Using Weak Feature Correspondence", Acoustics Speech and Signal Processing (ICASSP), 2010 IEEE International Conference on, IEEE, Piscataway, NJ, USA, Mar. 14, 2010, pp. 1262-1265.

David Martinus Johannes Tax: "One-class Classification—Concept-learning in the Absence of Counter-examples", In: "One-class classification Concept-learning in the Absence of Counter-examples", Jun. 19, 2001.

Antonakaki, P., et al, "Detecting Abnormal Human Behaviour using Multiple Cameras", Signal Processing, Elsevier Science Publishers, B.V. Amsterdam, NL, vol. 89, No. 9, Sep. 1, 2009.

\* cited by examiner

ACTIVITY DETERMINATION AS FUNCTION OF TRANSACTION LOG

BACKGROUND

The present invention relates to the analysis of human activities, and in one aspect to accurately determining and distinguishing behaviors represented in videos.

In a variety of contexts there may be a desire to monitor human activities for the occurrence or omission of certain activities, for example to comply with activity processes and policies. Compliance failures may result in injuries from failure to observe safety regulations or physical barriers, theft in business and retail establishments and other losses or loss exposures. Gaps in procedure may be identified for remedy, for example through retraining, by capturing and recording behavior deviations with video systems for subsequent or contemporaneous analysis. However, human review and analysis of video feeds is time consuming and perhaps inefficient with respect to human resource allocations and, accordingly, it is desirable to implement automated systems for video analysis. Automated analysis of videos for determining human activities and behaviors presents a number of challenges, including providing for desired levels of accuracy in determinations of occurrences of human activities of concern, which must be recognized and sometimes distinguished from other activities, and wherein false alerts and missed event recognitions must occur at an acceptable level.

BRIEF SUMMARY

One embodiment of a method for determination of human behavior alerts from a video stream comprehends parsing a video stream via a programmable device into a plurality of segments, each of the segments either temporally related to at least one of a plurality of temporally distinct transactions in an event data log; or they are each associated with a pseudo transaction marker if not temporally related to at least one of the temporally distinct transactions, and an image analysis indicates a temporal correlation with at least one of the distinct transactions is expected. Visual image features are extracted from the segments and one-SVM classification is performed on the extracted features to categorize segments into inliers or outliers relative to a threshold boundary. Event of concern alerts are issued with respect to the inlier segments associated with the associated pseudo transaction marker.

In another embodiment, a computer system that determines human behavior alerts from a video stream includes a processing unit, computer readable memory, a computer readable storage system and program instructions stored on the computer readable storage system for execution by the processing unit via the computer readable memory to parse a video stream into a plurality of segments, each either temporally related to at least one of a plurality of temporally distinct transactions in an event data log; or each associated with a pseudo transaction marker if not temporally related to at least one of the temporally distinct transactions, and an image analysis indicates a temporal correlation with at least one of the distinct transactions is expected. The program instructions are also to extract visual image features from the segments and perform a one-SVM classification on the extracted segment features to categorize the segments into inliers or outliers relative to a threshold boundary. The program instructions are further to issue event of concern alerts with respect to inlier segments associated with the associated pseudo transaction marker.

In another embodiment, a computer program product to determine human behavior alerts from a video stream comprehends a computer readable storage medium and program instructions stored therein to parse a video stream into a plurality of segments, each either temporally related to at least one of a plurality of temporally distinct transactions in an event data log; or each associated with a pseudo transaction marker if not temporally related to at least one of the temporally distinct transactions, and an image analysis indicates a temporal correlation with at least one of the distinct transactions is expected. The program instructions are also to extract visual image features from the segments and perform a one-SVM classification on the extracted segment features to categorize the segments into inliers or outliers relative to a threshold boundary. The program instructions are further to issue event of concern alerts with respect to inlier segments associated with the associated pseudo transaction marker.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
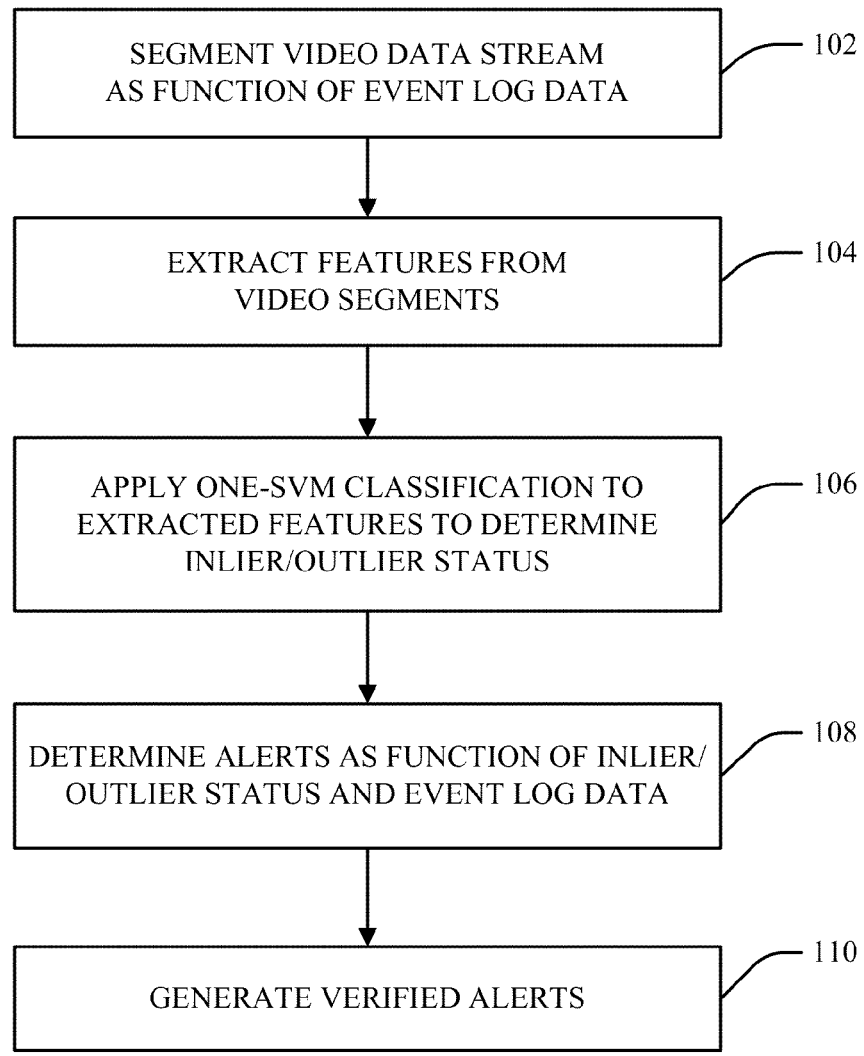
FIG. 1 illustrates an embodiment of a method or system for unsupervised determination of human behavior according to the present invention.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Historically, compliance of human activity with policies, regulations, etc. has typically been enforced through direct human surveillance. For example, safety and security personnel may watch cameras trained on certain areas to discover deviations from safety policies, trespassing, theft, unauthorized access to restricted areas, etc. However, human visual attention may be ineffective, particularly for large volumes of video data. Due to many factors, illustratively including an infrequency of activities of interest, a fundamental tedium associated with the task and poor reliability in object tracking in environments with visual clutter and other distractions, human video surveillance may be both expensive and ineffective.

Automated video surveillance systems and methods are known wherein computers or other programmable devices directly analyze video data and attempt to determine the occurrence of activities of concern. However, object tracking by prior art automated video surveillance systems and methods systems is often not reliable in a realistic, real-world environments and applications due to clutter, poor or variable lighting and object resolutions and distracting competing visual information. Analysis of human activity within the video is generally limited to capturing and recognizing a set of certain predominant activities, each of which requires supervised learning and thus lots of labeled data, and wherein new constraints may not be added or defined to refine or enforce complete visual compliance determinations.

Referring now to FIG. 1, an embodiment of a method or system for unsupervised determination of human behavior alerts from video streams according to the present invention is illustrated. At 102 a programmable device according to the present invention parses a video stream into individual video segments as a function of correlations to temporally distinct events or transactions in event data log. The parsing comprises generating video segments that are either (i) temporally related to one or more of the transactions, or (ii) associated with a pseudo transaction marker if they are not temporally related to any of the transactions, and an image analysis of said segment indicates a temporal correlation with at least one transaction is expected. The video segments may be continuous sections of the video stream or they may be sets of individual frame image primitives. It will also be understood that events or transactions may contemplate a variety of logged data events, for example bar code scans, turnstile admissions, vehicles detected in relation to a transit point, badge swipes from an automated door lock, etc., and the present invention is not limited by the embodiments described herein.

At 104 visual image features are extracted from the video segments and a one— SVM (Support Vector Machine) classification is performed on the extracted features at 106 to categorize the segments into inliers or outliers relative to a threshold boundary. At 108 the classified segments are analyzed as a function of their inlier or outlier status as determined by the one-SVM classification, and further as a function of pseudo-event associations, in order to distinguish probable false alarms from determinations of occurrences of events of concern, and more particularly to issue event-of-concern alerts with respect to inliers associated with an associated pseudo transaction. Thus, alerts are issued at 110 with respect to the segments determined to indicate an occurrence of an event of concern subject to the above, in effect as distinguishing likely true events from probable false alarms.

Outliers associated with pseudo transaction markers are disregarded from alerts at 110, though such an association may indicate activity distinguishable from activities captured by other outliers. Thus, in some embodiments, alert generation at 110 may also comprise noting outliers associated with pseudo transaction markers for further analysis for events of concern in a subsequent inquiry, for example in a secondary optional auditing process when resources may be efficiently allocated after analysis of each inlier/pseudo marker association event alerted at 110.

Figure 2:
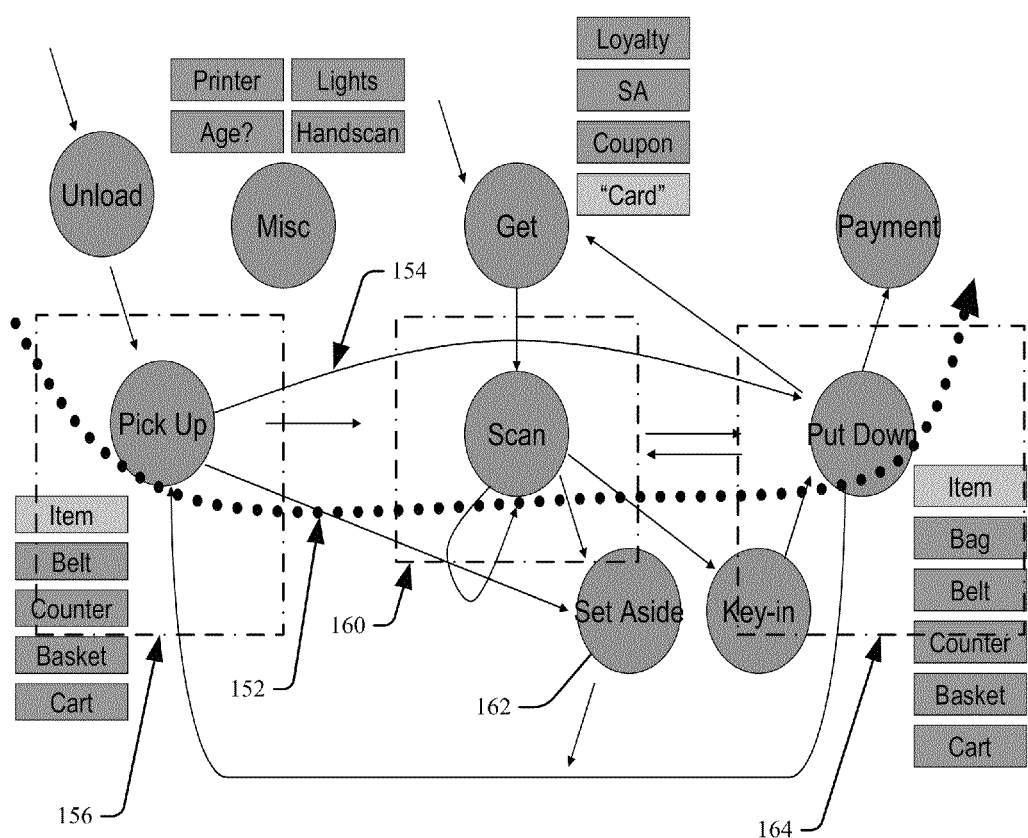
FIG. 2 illustrates an overhead perspective state diagram of possible human movements for automated recognition according to the present invention.

One exemplary embodiment of the present invention is be implemented to detect "sweet-hearting" events as distinguished from other events that may also trigger alerts of concern through automated analysis of retail video streams. For example, FIG. 2 is an overhead perspective state diagram of a plurality of possible movements and actions 162 of a cashier in a retail context (for example of a scanning lane) with respect to possible movement vectors 152, 154. (It will be understood that as used herein "cashier" is a generic term to denote a person scanning an item, and that embodiments contemplate that the scanning person may be a clerk or cashier as well as a customer, bagger, manager or other person.) In a simple scanning motion path vector 152, an item is picked-up from a pick-up area 156, scanned by passing the item within scanning range of a scanner in a scanning area 160 and then put down in a bagging or drop area 164. Examples of the pick-up areas 156 include an intake belt, a counter, a shopping basket and a cart, and the put-down area 164 may be one or more of a distribution belt, counter, shopping basket or shopping cart, each of which may entail different motions. The vectors 154 each represent an observed motion relative to other actions 162 of a cashier and observable in a video feed, illustratively including unloading items, and getting and scanning loyalty cards, supervisor/assistant override cards (SA), coupons or other bar-code cards.

A significant portion of retail shrink may be attributed to employees and occurs around cashiers at the point of sale (POS). Sweet-hearting or "fake scanning" describes the action of a cashier in intentionally failing to scan or otherwise enter an item into a retail transaction in order to provide the merchandise free of charge for a customer presenting the items for purchase, usually by moving the item from an input (pick-up) location through the processing (scan) area and into the output (drop or bagging) area by covering up the item bar code, stacking an item on top of another to occlude the scanner from reading the code or passing the item around the scan area during a scan motion to intentionally avoid a bar code reader in the scan area with respect to a bar code of the free item.

Automated systems must account for many variances and divergences of images to adequately distinguish sweet-hearting from other (perhaps regular, legitimate) scanning activities in order to avoid issuing too many false alarms, or missing too many fake scans. Some prior art methods accomplish this through "supervised" learned model classification systems and methods which distinguish fake scans from other scans through analyzing image attributes of known occurrences of each and thereby learn to distinguish occurrences of classified events by comparing learned models to video stream images to select images meeting the parameters of the models. However, such approaches are limited by their ability to create accurate and effective models of attributes to indicate alerts from human scanning motions, and they must efficiently compare the video stream images to the model and thereby identify events of concern. Accuracy may be compromised due to lack of known ground truths for certain events of concern and, without prior knowledge of fraudulent activity, assumptions must be made. Further, visually imperceptible fraudulent activity may not be determined through comparison to learned models due to the lack of visually distinctive differences in the image captured by the video stream.

Figure 3:
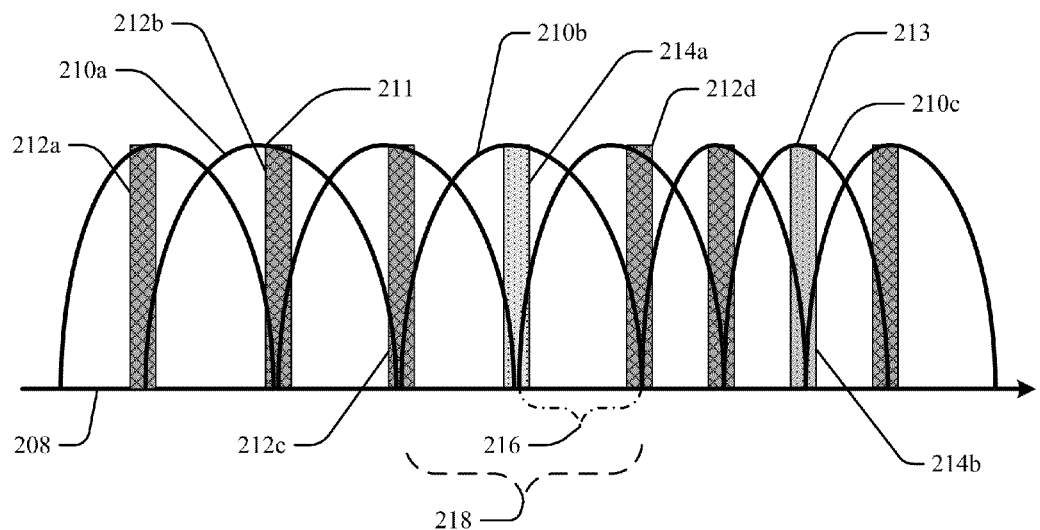
FIG. 3 is a graphical illustration of segmenting a video stream as a function of a temporal relationship of video images or portions to transactions from a transaction log according to the present invention.

In contrast, embodiments of the present invention segment the video stream into segments or image primitives at 102 (FIG. 1) as a function of associated logged transactions, and analyze the segments for similarities and divergences relative to other segments; no comparison to ground truths or learned models is performed or necessary. FIG. 3 provides a graphical illustration of segmenting a video stream as a function of a temporal relationship of images or portions 210 of the video stream to a plurality of transactions 212 from a transaction log and which occur in a temporal series over a time line 208 according to the present invention. In the retail context of FIG. 2, the transactions 212 are bar code scans recorded by a register, though other embodiments may use other transactions, and illustrative but not exhaustive examples include turnstile admissions, vehicles detected in relation to a transit point, badge or card swipes from an automated door lock, ticket kiosk, etc. Thus, though the present embodiment is described with respect to bar code scans, it will be understood by one skilled in the art that any series of associated, discrete time-ordered transactions may be used to create video segments according to the present invention.

In the present embodiment a segment 210 is defined as spanning three consecutive bar code scans 212 wherein each bar code scan 212 is expected to occur within a specified time duration threshold or constraint 216 of a subsequent bar code scan 212; for example, segment 210a spans a video stream portion from a first-in-time scan 212a through a next, second scan 212b and ending at a last, third scan 212c. The specified threshold 216 is selected to represent an expected maximum delay between item scanning events in a typical, normal cashier transaction; illustrative but not exhaustive examples include two seconds and five seconds, and other specified thresholds 216 may be practiced as required by a respective implementation. The segments 210 may comprise a continuous video segment comprising a plurality of images or, in alternative embodiments, they may comprise one or more individual image primitives 210 selected from the video stream in temporal relationship with any of the segments 210; for example, at least one primitive selected from the segment curve 210a indicated as most relevant to or temporal with the second bar code scan 212b of the scanned bar code scan triplet of, for example, an image at a highest point 211 of the curve 210a.

If a gap between adjacent bar code scans 212 is longer than the specified threshold 216, for example the time gap 218 along the time axis 208 between 212c and 212d, then embodiments of the present invention perform an automated analysis of a video segment 210b defined there between for certain motions or levels or motion or other activity relevant to an expected, missing scan, and if the analysis finds that an expected specified visual activity is present in the segment/primitive 210b (for example, certain motions, levels of general activity or certain motions, etc.) then a pseudo-scan 214a is incorporated or otherwise associated with the segment/primitive 210b. Pseudo-scans may be associated within the specified threshold of either of the initial scan or a final scan spanning a long-gap segment (for example, pseudo-scan 214a is associated within the specified threshold 216 of the final scan 212d); or it may be located in an alternative fashion, for example midway between them, or with respect to pseudo-scan 214b at a highest point 213 of the curve 210c, and still other locations or association may be practiced according to the present invention.

Some embodiments of the present invention analyze long-gap segments by considering distinct Region of Interests (ROI) defined for the creation and analysis of the segments/primitives 210. Motion pixels obtained by frame differencing (or differentiating) a video stream ma be counted in each ROI for each frame and normalized by the area of the ROI. Referring again to FIG. 2, in an embodiment adapted to determine sweet-hearting in an "in/out" scanning process, a pick-up area 156, a scan area 160 and a drop-off area 164 are defined for creating respective pick-up, scan and drop-off primitives as a function of patterns observed in motion sequences within said areas, generally in response to motion pixels associated with the movement of an item and/or a hand (or both hands) of a cashier within each region. Each area 156/160/164 may itself define a ROI, with motion pixels obtained by frame differencing a video stream counted in each ROI for each frame and normalized by the area of the respective ROI 156/160/164. Alternatively, any region 156/160/164 may encompass multiple distinct (and sometimes overlapping) ROI's to provide additional granularity or primitive creation capabilities.

Figure 5:
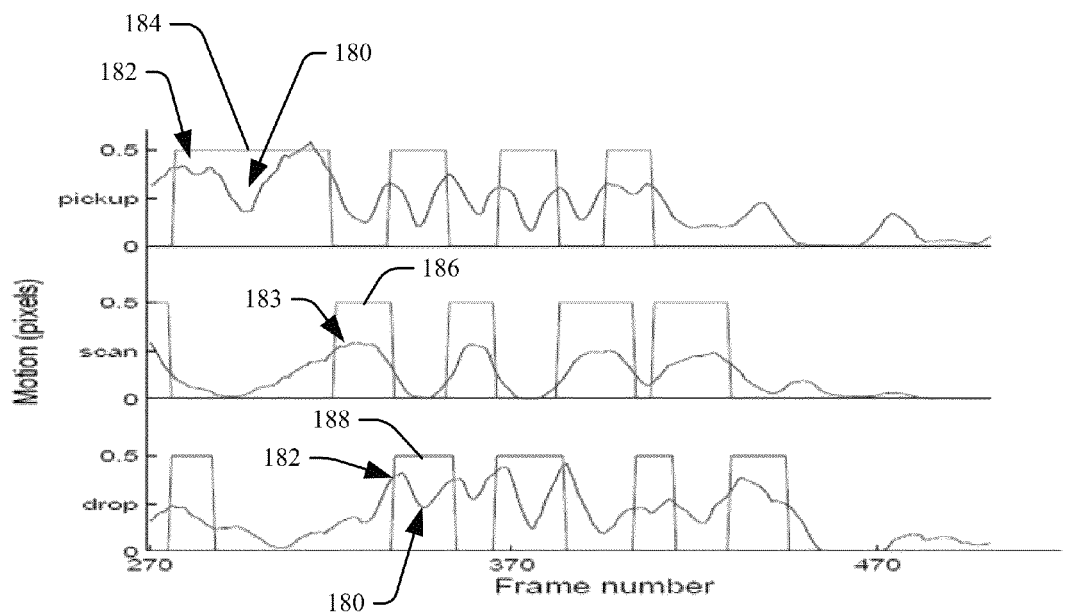
FIG. 5 is a graphical illustration of motion sequences for exemplary events according to the present invention.

One example distinguishing motion patterns observed in resulting motion sequences within ROI's relevant to bar code scans and appropriate for practice with the present invention is taught by "Detecting Sweethearting in Retail Surveillance Videos" by Quanfu Fan et al., ICCASSP, 2009, wherein FIG. 5 provides exemplary graphical illustrations for motion sequences for each of pickup, scan and drop events. Each pickup and drop event may be recognized by a pair of peaks 182 with a valley 180 located in-between, depicting a motion change caused by an interaction between a cashier's hand(s) and a specified region during an event. The valleys 180 correspond to the moment of a short pause when a hand is about to reach an item (pickup) or to retrieve an item (drop), and the locations of the two associated peaks 182 roughly correspond to a start and an end time of an event.

Figure 6:
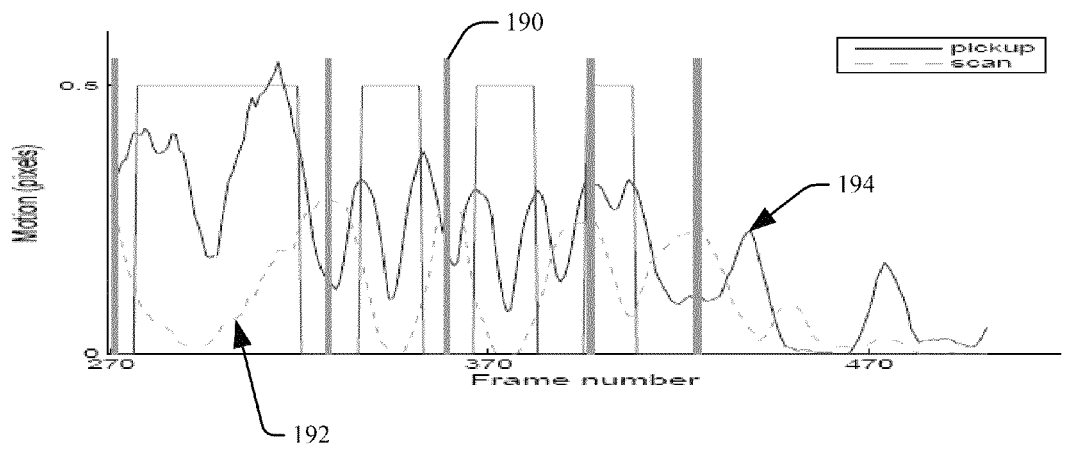
FIG. 6 is a graphical illustration of motion peaks according to the present invention.

While patterns indicated by primitive events may be visually identifiable, it may be difficult in prior art approaches to segment them in a meaningful way in a motion sequence. Pickup, scan and drop occur sequentially, thus temporal ordering suggests that there should be one pickup 184 prior to a scan 186 which is followed by a drop 188, which provides guidance in identifying a primitive or segment type and applying the appropriate motion thresholding. For example, referring to FIG. 6, motion peaks 190 in each scan profile 192 may be located and used as dividers to separate pickup and drop events (illustrated presently through overlaying the scan profile 192 and a pick-up motion profile 194).

Referring again to FIG. 1, with the video thus segmented, and pseudo-scans 214 associated as appropriate, features of the segments/primitives 210 are extracted at 104. In some embodiments, feature extraction comprehends Space-Time Interest Points (STIPs), spatiotemporal features computed from local image points with both large intensity change and large variations in time and roughly correspond to moments when there is abrupt motion change, such as stopping or starting; for example, see "Space-time interest points," I. Laptev and T. Lindeberg, ICCV 2003, at pp. 432-439. Thus, several STIPs may be detected near a cashier's hand at the moment when the hand is about to reach (pickup) or drop an item, and an STIPs detector may automatically select spatial and temporal scales with regard to the size and duration of said events wherein a spatio-temporal volume is formed for each STIP and further divided into grids of cuboids. In some embodiments, histograms of oriented gradient (HoG) and optic flow (HoF) may be computed, normalized and concatenated into a local descriptor for each cuboid.

In some embodiments, a Bag of Features (BOF) model is built to represent an event wherein spatio-temporal features from a specified region are clustered into discrete "visual words" groups based on their similarities and a histogram of word occurrence frequency is constructed to form a compact representation of the event, the histogram representation is used for classification with approaches. Examples of BOF modeling are taught by "Learning realistic human actions from movies" by Marszalek et al., CVPR08 2008, and other examples will be apparent to one skilled in the art.

Still other embodiments may take locally maximum points of a squared weighted gradient norm function as the interest points in a video, for example pursuant to a function representing gray-scale values of a video clip. Thus, embodiments of the present invention may utilize a detector that takes locally maximum points of a squared weighted gradient norm function as interest points in the video segments, for example pursuant to the following function $$g(x, y, t) = \left(\frac{\partial I}{\partial x}\right)^2 + \left(\frac{\partial I}{\partial y}\right)^2 + \alpha\left(\frac{\partial I}{\partial t}\right)^2; \quad [1]$$

wherein I(x,y,t) represents gray-scale values of the video clip, α is larger than 1 to emphasize the fact that temporally salient points are more likely to be related to interesting events. Points (x, y, t) with relatively small g function values below a threshold $P^{th}$ percentile over a whole video clip are also excluded in order to achieve truly spatial-temporal salient points. Thus, two kinds of features may be extracted from the video segments 210 relative to (i.e. around and at) the interest points: averaged color values in a small window around the interest points, i.e., [R,G,B]; and image gradient vectors, i.e. the terms [dI/dx, dI/dy] of formulation [1]. Said features together may compose a color feature or description vector containing both appearance and texture information at each detected interest point in a video. Accordingly, in one embodiment, each event primitive P may be treated as a bag of features (BOF) according to formulation [2]:

$$P = \{p_i\}_{i=1}^{NP} \quad [2]$$

wherein $p_i$ is a color feature vector.

Figure 4:
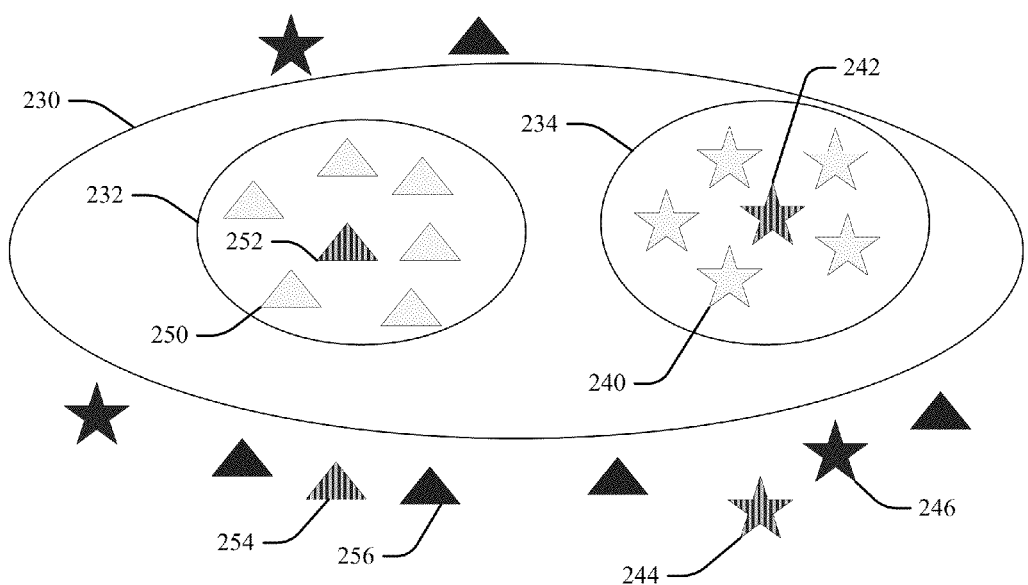
FIG. 4 is an illustration of the results of a one-SVM classification performed on extracted features according to the present invention with respect to the segments of FIG. 3.

FIG. 4 provides an illustration of the results of a one-SVM classification performed on the extracted features according to the present invention with respect to the segments 210 of FIG. 3. More particularly, normal human activity captured by the video stream (i.e. of a cashier in this example) is generally predominant and visually similar. Embodiments of the present invention apply a one-SVM technique to learn dominant clusters 232 and 234 of inliers within a threshold classification or boundary 230 in the feature space to represent normal human activity (i.e. normal cashier activity at a POS scanner in the present example) with respect to classification of each of the segments 210 as a function of their visual characteristics. The boundary 230 is a user-specified threshold beyond which segments 210 are determined to be dissimilar, outliers 244, 246, 254, or 256, for example, they do not share at least 80%, 90%, or 95% or some other threshold percentage of a possible 100 points of similarity with analogous inliers 250, 252, 240, or 242, and still other boundary thresholds may be practiced. One skilled in the art will also appreciate that the boundary 230 may be determined heuristically. The one-SVM technique thus learns a dominant cluster or clusters in feature space to represent normal cashier activity at the POS and provides a video analytical approach for detecting cashier fraud as distinguished from other scans at POS, in one aspect regardless of how the fraud is committed.

One-SVM techniques are known to those skilled in the art, and examples adaptable to practice with the present invention are taught by "Estimating the Support of a High— Dimensional Distribution," Bernhard Scholkopf et al., Neural Computation 13, pages 1443-1471 (2001); and by S. Andrews, T. Hofmann, and I. Tsochantaridis; "Multiple instance learning with generalized support vector machines," Artificial Intelligence pages 943-944, 2002; and "SVM Clustering" by Stephen Winters-Hilt and Sam Merat, BMC Bioinformatics 2007, 8 (Suppl. 7):S18. Accordingly, in one embodiment, utilizing "SVM Clustering" reference teachings clustering may be achieved in the feature space by grouping segment 210 objects based on their known similarities as inliers 250, 252, 240 or 242 within the threshold 230, and which may be further clustered within distinct clusters 232 and 234; or as outliers 254, 256, 244 or 246 beyond the threshold 230. For example, let $\{x_i\}$ be a data set of N points in Input Space $\{R^d\}$. Similar to a nonlinear SVM formulation, a non-linear transformation $\{\phi\}$ may be used to transform x to a high-dimensional space (a Kernel space) to look for a smallest enclosing cluster 232/234 or overall threshold 230 of radius $\{R\}$ by formulation [3]:

$$\|\phi(x_j)-a\|^2 \le R^2 \text{ for all } j=1,\ldots,N \qquad [b\ 3];$$

where $\{a\}$ is the center of the cluster 232/234 or overall threshold 230. Soft constraints may be incorporated by adding slack variables $\{\zeta_j\}$ pursuant to formulation [4]:

$$\|\phi(x_j)-a\|^2 \le R^2+\zeta_j \text{ for all } j=1,\ldots,N; \text{ subject to } \zeta_j \ge 0 \qquad [b\ 3];$$

A Lagrangian may thus be formulated as formulation [5]:

$$L=R^2+\Sigma_j\beta_j(R^2+\zeta_j-\|\phi(\chi_j)-a\|^2)-\Sigma_j\zeta_j\mu_j+C\Sigma_j\zeta_j; \text{ subject to } \beta_j \ge 0, \mu_j \ge 0 \qquad [5];$$

where C is the cost for outliers and therefore $\{C\Sigma_j\zeta_j\}$ serving as a penalty term. Taking the derivative of L w.r.t. R, $\zeta$ and setting them to zero, the following formulations [6] are provided:

$$\Sigma_j\beta_j=1$$

$$a=\Sigma_j\beta_j\phi(\chi_j), \text{ and}$$

$$\beta_j=C-\mu_j; \qquad [6]$$

Substituting the above formulations [6] back into the Lagrangian [5], the following dual formalism [7] may be provided:

$$W=1-\Sigma_{i,j}\beta_i\beta_jK_{ij} \text{ where } 0\le\beta_i\le C; K_{ij}=\exp(-\|x_i-x_j\|^2/26^2) \text{ subject to } \Sigma_i\beta_i=1; \qquad [7]$$

Then by Karush-Kuhn-Tucker (KKT) relations, the following formulation [8] may be provided:

$$\zeta_j\mu_j=0; \text{ and } \beta_j(R^2+\zeta_j-\|\phi(\chi_j)-a\|^2)=0. \qquad [8]$$

In the feature space, $\beta_j=C$ only if $\zeta_j>0$; hence, it lies outside of the cluster 232/234 or overall threshold 230, i.e. $R^2 \le \|\phi(x_j)-a\|^2$. This point becomes a bounded support vector or BSV. Similarly, if $\zeta_j=0$, and $0<\beta_j<C$, then it lies on the surface of the cluster 232/234 or overall threshold 230, i.e. $R^2=\|\phi(x_j)-a\|^2$. This point becomes a support vector or SV if $\zeta_j=0$, and $\beta_j=0$, then $R^2>\|\phi(x_j)-a\|^2$ and hence this point is enclosed within the cluster 232/234 or overall threshold 230.

Referring again to FIG. 4, in the present example, inliers within the boundary 230 are classified pursuant to one-SVM according to the present invention as a first type of scan event denoted by the triangle 250, 252, 254 or 256; or as a second type of scan event denoted by a stars 240, 242, 244 or 246. For example, the triangle-type may be single-handed item scan, wherein the star-type may be a two-handed item scan for a large or heavy item; or the triangle-type may be a left-handed item scan and the star-type is a right-handed item scan. Still other examples will be apparent to one skilled in the art, and other embodiments may also implement only one type or more than two types of event type classification.

Visually imperceptible fraudulent incidents of the segments 210 will by their nature visually agree with other normal behaviors (inliers) 250, 252, 240 or 242 within their respective clusters 232 and 234 as provided by the one-SVM analysis, and thus the boundary provides a useful decisions point in how to further distinguish false alerts from possible alerts determined from feature extraction and/or one-SVM classification. Thus, according to the present invention, false/fraudulent events 252 and 242 can be detected/distinguished by further checking the barcode information associated with each of the instances in the learned cluster(s) 232 and 234. In the present example, if the associated barcode is a pseudo-scan code 214 rather than a scan code 212 from the transaction log, then the clustered inlier is identified as a fraudulent transaction 252 or 242; as it is strongly visually similar to others within the respective clusters 232 or 234, it should have been associated with an actual, legitimate logged scan 212, and since it is not, it may be inferred that a scan was purposely avoided.

In contrast, perceptible fraudulent incidents are visually dissimilar to the normal cashier activity and thus will be classified as an outlier 254, 256, 244 or 246. The outliers include events 246 and 256 associated with logged transactions and events 254 and 244 associated with associated pseudo transaction markers. As the pseudo marker events 244/254 are not inliers, they are generally disregarded from fake-scan event alerts. However, their association with the pseudo markers may indicate that they are both visually dissimilar from the inliers and require longer time frames to complete from the other outliers. In some embodiment implementations, setting aside a large non-scanable item and keying in an item code through a keypad may result in a gap between logged bar codes of more than the specified threshold 216, though no "sweet-hearting" or other fake scan has actually occurred, and accordingly the outlier pseudo marker events 244/254 may be recognized as legitimate scanning events distinguishable from the other outlier events 246 and 256 associated with logged transactions, and wherein either of which may be further reviewed and analyzed in a subsequent, secondary process, the present invention thus enabling additional analysis efficiencies.

Thus, embodiments of the present invention provide for identifying visually imperceptible fraudulent inliers through unsupervised classification, which enables fraud detection not possible through supervised prior art systems due to the lack of ground truth of fraudulent cashier activity models for said imperceptible frauds. Relevant images or video portions may be identified and segmented from the video stream without requiring supervised learning, labeled data, complex modeling, human behavior inference schemes, or without knowing or determining ground truths of fraudulent cashier activity or prior knowledge of fraudulent activity. No prior knowledge of fraudulent activity is required, and only assumptions regarding distinguishing specified thresholds 216 are needed. Incorporation of logged transaction (for example, barcodes) information into the classification at 106 directly enables fraud detection according to the present invention, rather than merely verifying fraud determined through other systems.

Figure 7:
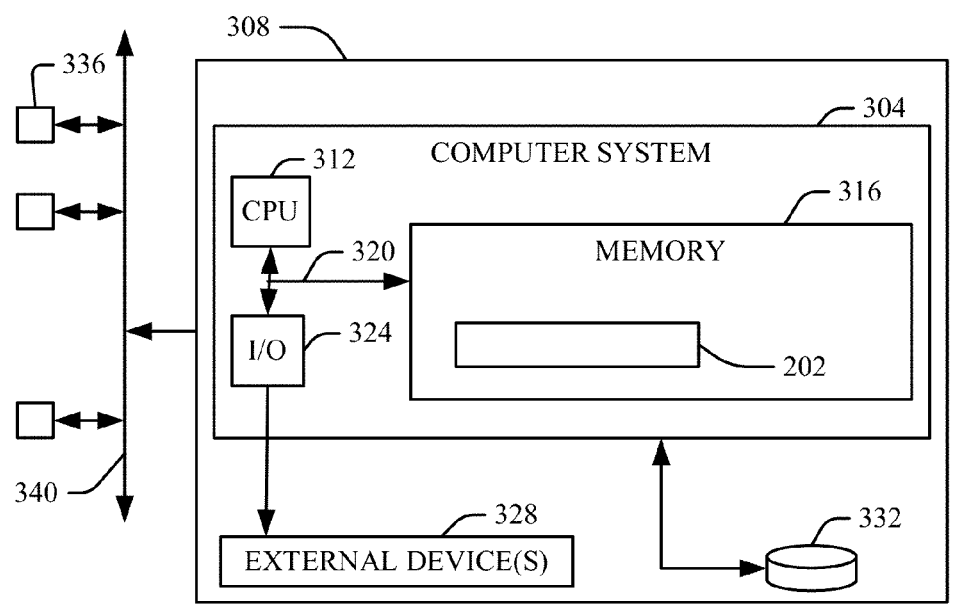
FIG. 7 is a computerized implementation of an embodiment of the present invention.

Referring now to FIG. 7, an exemplary computerized implementation of an embodiment of the present invention includes computer or other programmable device 304 in communication with devices 336 (for example, a video camera or video server) that analyzes video data for determination of human behavior according to the present invention, for example in response to computer readable code 202 in a file residing in a memory 316 or a storage system 332 through a computer network infrastructure 308. The implementation is intended to demonstrate, among other things, that the present invention could be implemented within a network environment (e.g., the Internet, a wide area network (WAN), a local area network (LAN) or a virtual private network (VPN), etc.) Communication throughout the network 308 can occur via any combination of various types of communications links; for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 308 is intended to demonstrate that an application of an embodiment of the invention can be deployed, managed, serviced, etc. by a service provider who offers to implement, deploy, and/or perform the functions of the present invention for others.

The computer 304 comprises various components, some of which are illustrated within the computer 304. More particularly, as shown, the computer 304 includes a processing unit (CPU) 312 in communication with one or more external I/O devices/resources 328 and storage systems 332. In general, the processing unit 312 may execute computer program code, such as the code to implement one or more of the process steps illustrated in FIG. 1, which is stored in the memory 316 and/or the storage system 332.

The network infrastructure 308 is only illustrative of various types of computer infrastructures for implementing the invention. For example, in one embodiment, computer infrastructure 308 comprises two or more computing devices (e.g., a server cluster) that communicate over a network. Moreover, the computer 304 is only representative of various possible computer systems that can include numerous combinations of hardware. To this extent, in other embodiments, the computer 304 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 320/340 can comprise any system for exchanging information with one or more of an external server and/or client (not shown). Still further, it is understood that one or more additional components (e.g., system software, math co-processing unit, etc.), not shown, can be included in the computer 304 or server or client.

One embodiment performs process steps of the invention on a subscription, advertising, and/or fee basis. That is, a service provider could offer to provide automated analysis of video data for determination of human behavior. In this case, the service provider can create, maintain, and support, etc., a computer infrastructure, such as the network computer infrastructure 308 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles for automated analysis of video data for determination of human behavior described above. In this case, a computer infrastructure, such as the computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 304/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determination of human behavior alerts from a video stream, the method comprising:
   parsing a video stream via a programmable device into a plurality of segments, each of the segments either temporally related to at least one of a plurality of temporally distinct transactions in an event data log, or associated with a pseudo transaction marker if not temporally related to at least one of the temporally distinct transactions and an image analysis of said not temporally related segment indicates a temporal correlation with at least one of the distinct transactions is expected, by:
   defining each segment as spanning three consecutive temporally distinct transactions, each within a specified time threshold of a next one of the temporally distinct transactions;
   identifying a one segment occurring between a first and a second of the consecutive temporally distinct transactions wherein a time gap between the first and the second transactions is longer than the specified threshold;
   performing an automated analysis of the one segment occurring between the first and the second transactions to determine a presence of an expected specified visual activity; and
   associating the one segment occurring between the first and the second transactions with the pseudo transaction marker if an expected specified visual activity is determined by the performed automated analysis;
   extracting visual image features from the segments;
   performing a one-support vector machine classification on the extracted segment features to categorize the segments into inliers or outliers relative to a threshold boundary; and
   issuing event of concern alerts with respect to each of the inlier segments associated with the associated pseudo transaction marker; and
   wherein the performing the automated analysis of the one segment occurring between the first and the second transactions to determine the presence of the expected specified visual activity comprises:
   taking locally maximum points of a squared weighted gradient norm function as interest points in the one segment;
   extracting averaged color values and image gradient vectors relevant to the interest points; and
   composing color feature vectors from the extracted averaged color values and the extracted image gradient vectors.

2. The method of claim 1, wherein the human behavior is sweet-hearting within a scanning lane video stream;
   wherein the programmable device segments a scanning lane video stream into the segments; and
   wherein the issuing the event of concern alerts comprises identifying the each of the inlier segments associated with the associated pseudo transaction marker as fake-scans.

3. The method of claim 1, wherein the specified time threshold is selected from a range of from two to five seconds.

4. The method of claim 1, wherein the performing the one-support vector machine classification on the extracted segment features to categorize the segments into inliers or outliers relative to the threshold boundary comprises:
   learning dominant clusters of inliers within the threshold boundary in feature space to represent normal human activity; and
   wherein the threshold boundary is a threshold beyond which the segments are determined to be visually dissimilar to the outliers.

5. The method of claim 4, wherein performing the one-support vector machine classification on the extracted segment features to categorize the segments into inliers or outliers relative to the threshold boundary comprises:
   defining a data set of points within an input space radius; and
   transforming the data set to a high-dimensional space to find a smallest radius of an enclosing dominant cluster or threshold boundary as a function of a slack variable soft constraint.

6. The method of claim 4, wherein the issuing the event of concern alerts with respect to each of the inlier segments associated with the associated pseudo transaction marker further comprises:
   distinguishing outliers associated with the pseudo transaction markers from outliers temporally related to at least one of the plurality of temporally distinct transactions in the event data log.

7. A computer system for harmonizing business process tasks, the computer system comprising:
   a processing unit, computer readable memory and a computer readable storage system;
   first program instructions to parse a video stream into a plurality of segments, each of the segments either temporally related to at least one of a plurality of temporally distinct transactions in an event data log, or associated with a pseudo transaction marker if not temporally related to at least one of the temporally distinct transactions and an image analysis of said not temporally related segment indicates a temporal correlation with at least one of the distinct transactions is expected, by:
   defining each segment as spanning three consecutive temporally distinct transactions, each within a specified time threshold of a next one of the temporally distinct transactions;
   identifying a one segment occurring between a first and a second of the consecutive temporally distinct transactions wherein a time gap between the first and the second transactions is longer than the specified threshold;
   performing an automated analysis of the one segment occurring between the first and the second transactions to determine a presence of an expected specified visual activity; and
   associating the one segment occurring between the first and the second transactions with the pseudo transaction marker if an expected specified visual activity is determined by the performed automated analysis;

second program instructions to extract visual image features from the segments and perform a one-support vector machine classification on the extracted segment features to categorize the segments into inliers or outliers relative to a threshold boundary; and third program instructions to issue event of concern alerts with respect to each of the inlier segments associated with the associated pseudo transaction marker; and wherein the first, second and third program instructions are stored on the computer readable storage system for execution by the processing unit via the computer readable memory; and wherein the first program instructions are further to perform the automated analysis of the one segment occurring between the first and the second transactions to determine the presence of the expected specified visual activity by:

taking locally maximum points of a squared weighted gradient norm function as interest points in the one segment;

extracting averaged color values and image gradient vectors relevant to the interest points; and composing color feature vectors from the extracted averaged color values and the extracted image gradient vectors.

8. The computer system of claim 7, wherein the human behavior is sweet-hearting within a scanning lane video stream;

wherein the first program instructions are to segment a scanning lane video stream into the segments; and wherein the third program instructions are to issue event of concern alerts identifying the inliers associated with the pseudo transaction marker as fake-scans.

9. The computer system of claim 7, wherein the second program instructions are further to perform the one-support vector machines classification on the extracted segment features to categorize the segments into inliers or outliers relative to the threshold boundary by:

learning dominant clusters of inliers within the threshold boundary in feature space to represent normal human activity; and wherein the threshold boundary is a threshold beyond which the segments are determined to be visually dissimilar to the outliers.

10. A computer program product for harmonizing business process tasks, the computer program product comprising:

a computer readable storage memory device;

first program instructions to parse a video stream into a plurality of segments, each of the segments either temporally related to at least one of a plurality of temporally distinct transactions in an event data log, or associated with a pseudo transaction marker if not temporally related to at least one of the temporally distinct transactions, and an image analysis of said not temporally related segment indicates a temporal correlation with at least one of the distinct transactions is expected, by:

defining each segment as spanning three consecutive temporally distinct transactions, each within a specified time threshold of a next one of the temporally distinct transactions;

identifying a one segment occurring between a first and a second of the consecutive temporally distinct transactions wherein a time gap between the first and the second transactions is longer than the specified threshold;

performing an automated analysis of the one segment occurring between the first and the second transactions to determine a presence of an expected specified visual activity; and associating the one segment occurring between the first and the second transactions with the pseudo transaction marker if an expected specified visual activity is determined by the performed automated analysis;

second program instructions to extract visual image features from the segments and perform a one-support vector machine classification on the extracted segment features to categorize the segments into inliers or outliers relative to a threshold boundary; and third program instructions to issue event of concern alerts with respect to each of the inlier segments associated with the associated pseudo transaction marker; and wherein the first, second and third program instructions are stored on the computer readable storage memory device; and wherein the first program instructions are further to perform the automated analysis of the one segment occurring between the first and the second transactions to determine the presence of the expected specified visual activity by:

taking locally maximum points of a squared weighted gradient norm function as interest points in the one segment;

extracting averaged color values and image gradient vectors relevant to the interest points; and composing color feature vectors from the extracted averaged color values and the extracted image gradient vectors.

11. The computer program product of claim 10, wherein the human behavior is sweet-hearting within a scanning lane video stream;

wherein the first program instructions are to segment a scanning lane video stream into the segments; and wherein the third program instructions are to issue event of concern alerts identifying the inliers associated with the pseudo transaction marker as fake-scans.

12. The computer program product of claim 10, wherein the second program instructions are further to perform the one-support vector machine classification on the extracted segment features to categorize the segments into inliers or outliers relative to the threshold boundary by:

learning dominant clusters of inliers within the threshold boundary in feature space to represent normal human activity; and wherein the threshold boundary is a threshold beyond which the segments are determined to be visually dissimilar to the outliers.

* * * * *